United States Patent Office 2,963,472
Patented Dec. 6, 1960

2,963,472
METALLIFEROUS AZO-DYESTUFFS

Karl Seitz, Allschwil, and Henri Riat, Arlesheim, Switzerland, assignors to Ciba Limited, Basel, Switzerland No Drawing. Filed Sept. 25, 1958, Ser. No. 763,174

Claims priority, application Switzerland Sept. 27, 1957

6 Claims. (Cl. 260—146)

This invention provides new metalliferous azo-dyestuffs which contain one atom of a heavy metal, more especially chromium or cobalt, bound in complex union to two azo-dyestuff molecules which contain a monohalogentriazine radical which is bound, on the one hand, through a nitrogen bridge to a metalliferous dyestuff, and, on the other, to an azo-dyestuff free from heavy metal bound in complex union. The invention provides more especially a 1:2-complex chromium or cobalt compound of an azo-dyestuff which contains at least one sulfonic acid or carboxylic acid group and, bound through a nitrogen bridge, a monochloro-1:3:5-triazine radical of the formula (1)

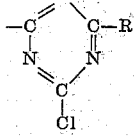

in which R represents the radical of a compound which contains an azo linkage and is free from heavy metal, and above all the radical of a metal-free amino-monoazo-dyestuff bound to the triazine radical through its amino group.

Among the metalliferous azo-dyestuffs on this invention especially advantageous are those which contain a benzene radical as the radical of a coupling component or especially as the radical of the diazo-component. Especially valuable, therefore, are the 1:2-complex chromium and cobalt compounds of azo-dyestuffs of the formula (2)

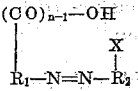

in which $n$ is the whole number 1 or 2, X represents an amino or hydroxyl group, $R_1$ represents the radical of a diazo-component, advantageously a diazo-component of the benzene series, which is bound to the azo linkage in a position vicinal to the —(CO)$_{n-1}$—OH, and $R_2$—X represents the radical of a coupling component bound to the azo linkage in a position vicinal to the group X, and in which one of the radicals $R_1$ and $R_2$ is a benzene radical and one of these radicals contains a triazine radical of the Formula 1 bound thereto through an —NH— group.

The metalliferous azo-dyestuffs of this invention can be made by treating the appropriate metallizable dyestuff which contains a triazine ring as defined above, with an agent yielding chromium or cobalt, or advantageously by introducing such a triazine radical into the appropriate metalliferous azo-dyestuff containing no monohalogen-triazine radical. For this purpose one chlorine atom in a trihalogen-triazine, especially cyanuric chloride (2:4:6-trichloro-1:3:5-triazine), may be replaced by reaction with a 1:2-complex chromium or cobalt compound of a monoazo-dyestuff which contains an acylatable amino group, and a second chlorine atom may be replaced by reaction with a metal-free amino-azo-dyestuff, these reactions being carried out in either order of succession. Thus, for example, a metalliferous azo-dyestuff which contains an acylatable amino group may be reacted with a 2:4-dichloro-1:3:5-triazine containing in the 6-position the radical of a metal-free amino-monoazo-dyestuff, for example, with a dihalogen-triazine of the formula (3)

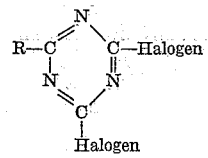

in which R has the meaning given with reference to Formula 1, in such manner that only one of the two halogen atoms reacts with the acylatable amino group. Alternatively, the metalliferous azo-dyestuff may first be reacted with cyanuric chloride and one of the two chlorine atoms in the resulting primary condensation product, which contains two exchangeable chlorine atoms per triazine nucleus, reacted with a metal-free amino-azo-dyestuff which contains at least one acid group imparting solubility in water.

The dihalogen-triazines of the Formula 3 can be made by methods in themselves known from cyanuric halides, such as cyanuric bromide or cyanuric chloride, by reacting, for example, 1 molecular proportion of cyanuric chloride with 1 molecular proportion of an azo-dyestuff which contains an acylatable group, more especially an acylatable amino group, and a group imparting solubility in water, if it is to be combined with a metalliferous azo-dyestuff free from groups imparting solubility in water. As such metal-free azo-dyestuffs there may be mentioned more especially mono-azo-dyestuffs and as monoazo-dyestuffs there may be used those which contain the acylatable amino group in the coupling component or in the diazo-component.

For making the dyestuffs which contain the acylatable amino group in the coupling component there are used, for example, coupling components of the benzene series or naphthalene series which owe their capacity for coupling to the presence of an at most secondary amino group or an aromatically bound hydroxyl group, and also keto-methylene compounds which contain, in addition to the methylene group capable of coupling and which is in a position vicinal to an enolisable keto group, an acylatable amino group which is advantageously aromatically bound. As such coupling components there may be mentioned, for example ω-methane sulfonic acid derivatives of aniline, of ortho-methoxyaniline or of ortho-aminobenzene carboxylic acid (which ω-methane sulfonic acid group is split off by hydrolysis after production of the dyestuff to liberate the amino group), and also meta-toluidine, 3-acetylamino-1-aminobenzene, 1-amino-2-methyl-5-methoxy-benzene, 1-amino-2:5-dimethoxy- or -diethoxy-benzene, 1-amino-3-methoxy benzene, 1-amino-2-methoxy-5-isopropylbenzene, α-naphthylamine, 1-aminonaphthalene-7-sulfonic acid, 1-aminonaphthalene-6-sulfonic acid and especially aminonaphthol mono- or di-sulfonic acids, such as 2-amino-6-hydroxynaphthalene-8-sulfonic acid, 2-amino-8-hydroxynaphthalene-6-sulfonic acid, 1-amino-8-hydroxynaphthalene-2:4- or -3:6- or -4:6-disulfonic acid, 2-N-methylamino-8-hydroxynaphthalene-6-sulfonic acid, 2-alkylamino- or 2-arylamino-5-hydroxynaphthalene-7-sulfonic acid, 2-amino-5-hydroxynaphthalene-7-sulfonic acid, 2-amino-5-hydroxynaphthalene-1:7-disulfonic acid, 2-(4'-aminobenzoylamino)-5-hydroxynaphthalene-7-sulfonic acid, 2-(4'-aminophenylamino)-5-hydroxynaphthalene-7-sulfonic acid, 2-(4'-amino-3'-sulfophenylamino)-5-hydroxynaphthalene-7-sulfonic acid and also β-keto-carboxylic acid derivatives, especially acetoacetic acid arylides such as 1-benzoylacetylamino-3- or 4-(4'-aminobenzoyl)-aminobenzene, 1-acetoacetylamino-4-aminobenzene-3-carboxylic acid, 1-acetoacetylamino-3-aminobenzene-4-sulfonic acid, 1-acetoacetylamino-4-aminobenzene-3-sulfonic acid, 1-acetoacetylamino-4-aminobenzene, and also other acetoacetylaminobenzenes which may be substituted in the benzene nucleus by alkyl or alkoxy groups or halogen atoms, 1-acetoacetylamino-4'-amino-diphenylmono- or di-sulfonic acid, 1-acetoacetyl-amino-4'-aminostilbene-2:2'-disulfonic acid and the monoacetoacetyl derivatives of 1:4-diaminodiphenyl-urea or of diamino-azobenzene sulfonic acids, and also 5-pyrazolones such as 1-(3'- or 4'-amino)-phenyl-3-methyl-5-pyrazolone and the corresponding sulfonic acids, 1-(3'- or 4'-amino)-phenyl-3-carboxy-5-pyrazolone and also compounds of the formula

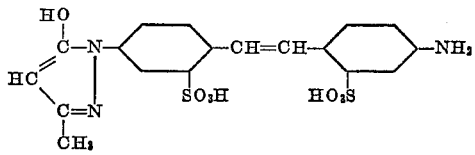

or

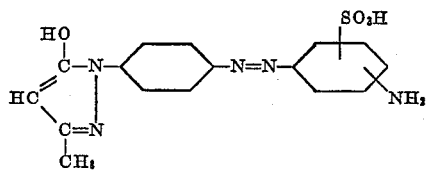

and finally compounds which are obtainable from these 1-aminoaryl-5-pyrazolones by nitrobenzoylation and reduction and which contain a condensible amino group and are capable of coupling in the 4-position of the pyrazolone nucleus.

The diazo-components to be coupled with these coupling components may contain substituents not imparting solubility in water and, if desired, azo linkages or strongly acid groups imparting solubility in water such as sulfonic acid groups. These diazo components may be relatively simple compounds, for example, alkyl-nitro-chloro- and/or alkoxyanilines, aminobenzene sulfonic acids, aminonaphthalene sulfonic acids, aminopyrene sulfonic acids, aminochrysene sulfonic acids, aminonaphthol sulfonic acids or aminophenol sulfonic acids, or they may be more complex diazotizable compounds which may contain one or two azo linkages.

For making the metal-free azo-dyestuffs used as starting materials, which contain the acylatable amino group in the diazo component there are used, for example, diazo-compounds of monoacylated aromatic diamines, for example, monoacyl derivatives of 4:4'-diaminodiphenyl-3-sulfonic acid, 4:4'-diaminostilbene-2:2'-disulfonic acid, 4-(4'-aminobenzoylamino)-1-aminobenzene-2-sulfonic acid, and especially of 1:3- or 1:4-diaminobenzene and above all 1:4-diaminobenzene-2-carboxylic acid, 1:3-diaminobenzene-4-sulfonic acid or 1:4-diaminobenzene-3-sulfonic acid, 2-methoxy-1:4-diaminobenzene-5-sulfonic acid, the acyl radical being hydrolyzed after coupling to liberate the amino group. As coupling components there may be used those which are free from acylatable amino groups, for example, β-keto-carboxylic acid esters or amides capable of coupling in the α-position, for example, acetoacetic acid arylides, pyrazolones, especially 5-pyrazolones, capable of coupling in the 4-position, such as 3-methyl-5-pyrazolone, 1-phenyl-3-methyl-5-pyrazolone, 1-phenyl-3-methyl-5-pyrazolone-2'- or -3'- or -4'-sulfonic acid, 1-phenyl-5-pyrazolone-3-carboxylic acid, 5-pyrazolone-3-carboxylic acid amides, barbituric acids, hydroxyquinolines and phenols, such as 2:4-dihydroxyquinoline, para-cresol, 2-carboxy-1-hydroxybenzene, naphthols such as α- or β-naphthol, β-naphthylamine, 2-hydroxynaphthalene-sulfonic acid amides, hydroxynaphthalene sulfonic acids such as 1-hydroxynaphthalene-3- or -4- or -5- or -8-sulfonic acid, 2-hydroxynaphthalene-4- or -5- or -6- or -7- or -8-sulfonic acid, 1:8-dihydroxynaphthalene-3:6-disulfonic acid, 2-hydroxynaphthalene-3:6- or -6:8-disulfonic acid, 1-hydroxynaphthalene-3:6- or -3:8-disulfonic acid, 2-aminonaphthalene-6-sulfonic acid and especially N-alkyl-, N-aryl- or N-acyl-derivatives of aminonaphthol sulfonic acids, which contain as an acyl radical, for example, an acetyl, propionyl, butyryl, chloracetyl, benzoyl, ortho-, meta-, or para-chlorobenzoyl, nitro-benzoyl, tertiary butyl-benzoyl, 3'- or 4'-aminobenzoyl, methane-sulfonyl or ethane-sulfonyl, para-toluene-sulfonyl or chlorobenzene-sulfonyl group, or a carbomethoxy or carbethoxy group or an acyl radical derived from a cyanuric acid. As examples there may be mentioned 1-acetylamino-8-hydroxynaphthalene-3:6-disulfonic acid and 2-phenylamino-5-hydroxynaphthalene-7-sulfonic acid.

The metalliferous azo-dyestuffs to be condensed with the resulting primary cyanuric chloride condensation products of the Formula 3 can be made by methods in themselves known, for example by using metallizable monoazo-dyesuffs which contain, in addition to the grouping capable of forming metal complexes, an acylatable group, especially an acylatable amino group, that is to say a primary or secondary amino group which is bound to the dyestuff molecule directly or through a bridge member, for example, through an arylene group. For making those metallizable monoazo-dyestuffs which contain the acylatable amino group in the coupling component ortho-hydroxy- or ortho-carboxy-diazo-compounds, preferably those of the benzene series, and especially diazotized ortho-aminophenols, such as chloro- or nitro-orthoaminophenols or sulfonic acid derivatives thereof, ortho-aminophenol sulfonic acid amides, ortho-aminophenol monosulfonic acid, orthoaminobenzoic acid or othoanisidine or sulfonic acids thereof may be coupled with coupling components which are capable of coupling in a position vicinal to a hydroxyl group (or enolizable keto group) and which also contain a further acylatable amino group or a substituent convertible into such a group, for example, into a nitro or easily hydrolyzable acylamino group, if no substituent of this kind is present in the coupling component used. As such coupling components there may be mentioned, for example, meta-aminophenol, 1-aryl-5-pyrazolones which contain in the aryl radical an amino group or a substituent convertible into an amino group after the manufacture of the dyestuff or after the metallization, for example, 1-(3'- or 4'-aminophenyl)-3-methyl-5-pyrazolone, 1-(3'- or 4'-aminophenyl)-5-pyrazolone-3-carboxylic acid and also β-keto-carboxylic acid arylides containing an acylatable amino group in the aryl radical, and amino-naphthol monosulfonic acids, such as 2-amino-8-hydroxynaphthalene-6-sulfonic acid, 2-N-methylamino-8-hydroxynaphthalene-6-sulfonic acid, 2-alkyl-amino-5-hydroxynaphthalene-7-sulfonic acid, 2-amino-5-hydroxynaphthalene-7-sulfonic acid, 2-methylamino-5-hydroxynaphthalene-7-sulfonic acid, 2-(4'-aminobenzoyl-amino)-5-hydroxynaphthalene-7-sulfonic acid, 2-(4'-aminophenylamino)-5-hydroxynaphthalene-7-sulfonic acid, 2-amino-6-hydroxynaphthalene-8-sulfonic acid or 1-amino-8-hydroxynaphthalene-3:6-disulfonic acid. The diazo components and coupling components must be so selected that the final dyestuff contains at least one acid group imparting solubility in water. Suitable metallizable dyestuffs are obtained by reducing ortho:ortho'-dihydroxy monoazo-dyestuffs containing a nitro group or ortho-carboxy-ortho'-hydroxy-monoazo-dyestuffs containing a nitro group or by hydrolysing metallizable monoazo-dyestuffs containing an acylamino group, for example, by splitting off the acyl group from a dyestuff obtainable from an ortho-hydroxy-diazo-compound of the benzene series containing an acylamino group, such as diazotized 6-acetylamino-2-aminophenol-4-sulfonic acid, and a coupling component of the kind mentioned above which contains no acylamino group.

The hydrolysis may be carried out before, during or after metallization of the dyestuff.

The conversion of the dyestuffs obtained from these components into the complex metal compounds to be used as starting materials in the process of this invention may be carried out while the dyestuffs are still present in the coupling mixture.

The treatment with an agent yielding chromium or cobalt in the process of this invention is carried out in such manner that the resulting chromiferous or cobaltiferous dyestuff contains one atom of chromium or cobalt bound in complex union to two monoazo-dyestuff molecules. Accordingly, the metallization may be carried out with such agents yielding chromium or cobalt and by such methods as yield complex chromium or cobalt compounds having the aforesaid constitution. It is generally of advantage to use less than one or advantageously about 0.5 atomic proportion of chromium or cobalt per molecular proportion of dyestuff and/or to carry out the metallization in a weakly acid to alkaline medium. Accordingly, there are especially suitable for carrying out the process those chromium or cobalt compounds which are stable in alkaline media, for example, complex chromium or cobalt compounds of aliphatic hydroxy-carboxylic acids or dicarboxylic acids and complex chromium compounds of aromatic ortho-hydroxy-carboxylic acids. As examples of aliphatic hydroxy-carboxylic acids or dicarboxylic acids there may be mentioned, inter alia, lactic acid, glycollic acid, citric acid and especially tartaric acid, and among the aromatic ortho-hydroxy-carboxylic acids there may be mentioned, for example, those of the benzene series, such as 4- or 5- or 6-methyl-1-hydroxybenzene-2-carboxylic acid and especially 1-hydroxybenzene-2-carboxylic acid itself. As agents yielding cobalt there are also suitable simple compounds of divalent cobalt, such as cobalt acetate or cobalt sulfate and, if desired, cobalt hydroxide.

The conversion of the dyestuffs into the complex chromium or cobalt compounds is advantageously carried out at a raised temperature under atmospheric or superatmospheric pressure, for example, at the boiling temperature of the reaction mixture, if desired, in the presence of suitable additions, for example, in the presence of a salt of an organic acid or of a base, or an organic solvent or other agent assisting the formation of complexes.

A unitary dyestuff may be subjected to the metallization process described above. However, it is also possible and in some cases of advantage (for example, for making dyestuffs yielding various shades), to metallize a mixture of two different metallizable monoazo-dyestuffs of the kind defined above. In this case it is possible, but not essential, to use a mixture of two different dyestuffs each of which is an ortho:ortho'-dihydroxy-monoazo-dyestuff. Alternatively, a mixture of an ortho:ortho'-dihydroxy-monoazo-dyestuff with an ortho-hydroxy-ortho'-amino-monoazo-dyestuff or ortho-carboxy-ortho'-hydroxy-monoazo-dyestuff may be metallized.

The metalliferous starting dyestuffs can also be made by metallizing nitrated monoazo-dyestuffs and subsequently reducing the nitro group present in the complex metal compounds.

The condensation of the metalliferous monoazo-dyestuffs with cyanuric chloride or with dihalogen-triazines of the Formula 3 is advantageously carried out in the presence of an agent capable of binding acid, such as sodium bicarbonate, sodium hydroxide or sodium carbonate, and under conditions such that one exchangeable halogen atom remains in the finished product per triazine nucleus, that is to say, for example, in the presence of an organic solvent or at a relatively low temperature in an aqueous medium.

In one form of the above process a metalliferous, especially a chromiferous or cobaltiferous, monoazo-dyestuff which contains an acylatable amino group and, if desired, a single acid group imparting solubility in water, is condensed with a cyanuric halide, especially cyanuric chloride, and in the resulting primary condensation products, which contain two exchangeable halogen atoms, per triazine nucleus, a second halogen atom is exchanged for the radical of an aromatic diamine, especially the radical of para- or meta-phenylene diamine sulfonic acid, the resulting metalliferous secondary condensation product is diazotized and then coupled with a coupling component appropriate for the synthesis of the aforesaid metal-free azo-dyestuff. Instead of exchanging one of the halogen atoms in the triazine nucleus of the metalliferous primary condensation product for the radical of an aromatic diamine it may be exchanged for the radical of a coupling component containing an acylatable amino group and capable of coupling in a position vicinal a hydroxyl group (including an enolizable keto group of a keto-methylene compound capable of coupling), and the condensation product so obtained is then coupled with a diazo-compound. As diazo-compounds there are of course used those appropriate for the synthesis of the metal-free dyestuff.

The dyestuffs obtained by the process of the invention are advantageously isolated at a low temperature by salting out and filtration. The isolated dyestuffs are dried, if desired, after the addition of an extender. Advantageously the drying is carried out at not too high a temperature and under reduced pressure. In certain cases dry preparations can be obtained by spray drying the mixture in which the dyestuff is prepared, that is to say, without first isolating the dyestuff. In this manner valuable new dry preparations are obtained which are suitable for the preparation of stock solutions or dyebaths or printing pastes.

The dyestuffs of this invention are valuable dyestuffs for dyeing or printing a very wide variety of materials, especially polyhydroxylated materials of fibrous structure, such as cellulosic materials and also synthetic fibers, for example, of regenerated cellulose or natural materials, for example, cellulose, linen or above all cotton. They are suitable for dyeing by the so-called direct dyeing methods from alkaline aqueous baths which may contain a high concentration of a salt, at liquor ratios above 5:1, and advantageously within the range of 15:1 to 50:1, and above all for application by the printing process or padding process, in which the dyestuff is applied to the material to be dyed by printing with a printing paste or by padding with a concentrated solution of the dyestuff, and the dyestuff is fixed on the material by means of an agent capable of binding acid and, if desired, by the action of heat.

In order to improve the properties of wet fastness it is of advantage to subject the dyeings or prints so obtained to thorough rinsing with cold and hot water, if desired, with the addition of an agent having a dispersing action and assisting diffusion of non-fixed dyestuff.

The dyeings produced with the new dyestuff on cellulosic fibres are usually distinguished by their good fastness to light and above all by their excellent fastness to washing.

The dyestuffs of this invention are also suitable for dyeing nitrogenous fibrous materials, such as superpolyamides, superpolyurethanes, silk, leather and especially wool, for example, from a weakly acid, neutral or weakly alkaline bath which may contain the usual assistants, for example, an ethylene oxide condensation product of an amine of high molecular weight. On wool there are obtained in this manner full level dyeings of good fastness to light and rubbing and having good properties of wet fastness.

The following examples illustrate the invention, the parts and percentages being by weight:

EXAMPLE 1

8.78 parts of the dyestuff of the formula

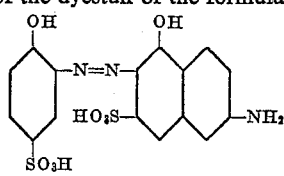

are dissolved in 100 parts of water and neutralised with sodium carbonate. After the addition of 2.4 parts of a 10 N-solution of sodium hydroxide and 62 parts of a cobalt sulfate solution of 5% strength, the mixture is heated for one hour at 75–80° C. After cooling the solution of the resulting 1:2-cobalt complex, it is neutralized with hydrochloric acid and adjusted to a volume of 300 parts.

After the addition of 4 parts of sodium bicarbonate, there are added to the above solution 8.15 parts of the dichlorotriazine derivative of the formula

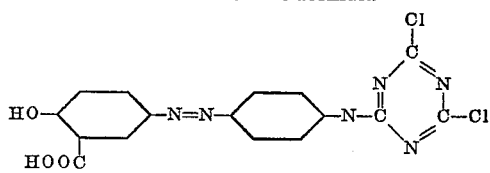

which is prepared in known manner, and the whole is heated for 5 hours at 40–45° C. After cooling the solution, it is filtered to remove any sparingly soluble by-products. By the addition of sodium chloride to the filtrate the monochlorotriazine dyestuff formed is precipitated. After filtering the mixture and drying the filter residue in vacuo at 70–75° C. there is obtained a dyestuff which dyes cotton strong brown tints of very good fastness to washing.

A dyestuff having similar properties is obtained by using as starting material the product obtained by coupling diazotised 2-aminophenol-4-sulfonic acid in an alkaline medium with 2-methylamino-5-hydroxynaphthalene-7-sulfonic acid.

Dyestuffs, which likewise yield brown tints, are obtained by converting into the dichlorotriazine derivatives in the manner described in this example the amino-azo-dyestuffs listed below in Table I, and reacting the dichlorotriazine derivatives with the 1:2-cobalt complex obtained as described in this example.

Table I

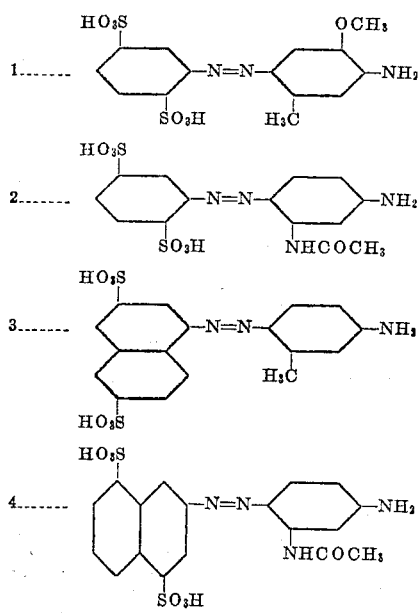

Table I—Continued

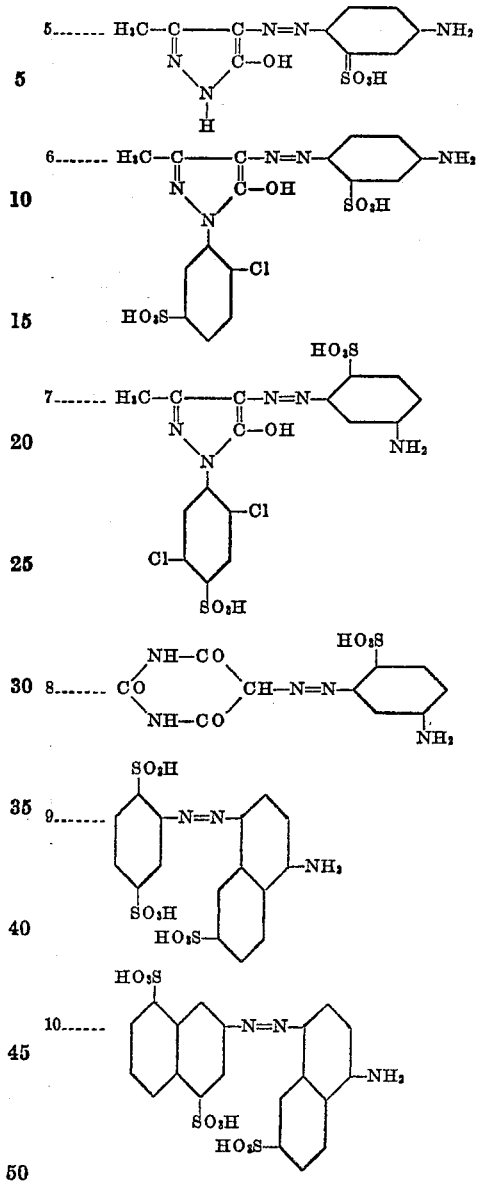

EXAMPLE 2

A neutral solution of the 1:2-cobalt complex, prepared as described in Example 1 from 8.78 parts of the dyestuff of the formula given in the first paragraph of that example, is cooled to 0–5° C., and a solution of 3.7 parts of cyanuric chloride in 50 parts of acetone is added. The hydrochloric acid liberated is continuously neutralized by the dropwise addition of a 1 N-solution of sodium hydroxide. To the neutral solution of the dichlorotriazine derivative so obtained is added a neutral solution of 8.02 parts of the amino-azo-dyestuff of the formula

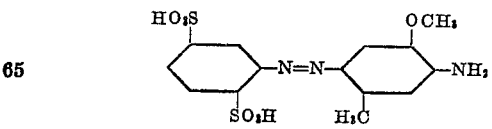

in 300 parts of water, and the whole is heated at 40–45° C., during which the pH-value of the solution is maintained between 6.5 and 7.5 by the dropwise addition of a 1 N-solution of sodium hydroxide. After the formation of the monochlorotriazine dyestuff it is salted out by adding sodium chloride, filtered off and dried.

The dyestuff dyes cotton brown tints which are fast to washing.

EXAMPLE 3

12 parts of the dyestuff of the formula

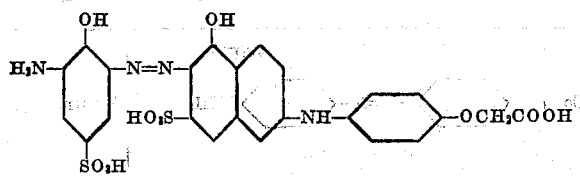

obtained by coupling diazotised 6-acetylamino-2-aminophenol-4-sulfonic acid in a medium rendered alkaline with sodium carbonate with 2-(4'-methoxycarboxy-phenylamino)-5-hydroxynaphthalene-7-sulfonic acid and then splitting off the acetyl group by heating the product with a dilute solution of sodium hydroxide, are suspended in 100 parts of water and neutralised with sodium hydroxide. After the addition of 2.4 parts by volume of a 10 N-solution of sodium hydroxide and 24 parts by volume of a sodium chromosalicylate solution containing 2.8 parts of chromium per 100 parts by volume of solution, the mixture is boiled under reflux for 3–6 hours. After being cooled, the solution of the 1:2-chromium complex so formed is neutralised with hydrochloric acid and adjusted to 300 parts by volume.

After the addition of 4 parts of sodium bicarbonate, there are added to the solution of the 1:2-chromium complex 11.9 parts of the dichlorotriazine compound of the formula

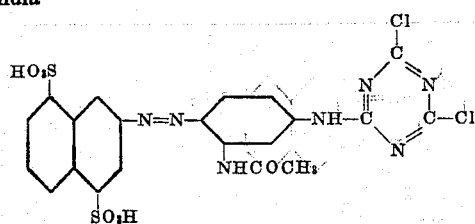

prepared in known manner, and the further procedure is the same as described in Example 1.

The dyestuff so obtained dyes cotton olive-green tints.

Further dyestuffs yielding on cotton the tints given in column IV of the following Table II are obtained in the manner described in Examples 1–3 by converting the amino-monoazo-dyestuffs given in column I into their 1:2-complex metal compounds, condensing the latter with cyanuric chloride to form the primary condensation products, and reacting the latter with the amino-azo-dyestuffs given in column III to form secondary condensation products. The metal used in each case is given in column II. The dyestuffs may be condensed with the cyanuric chloride in the reverse order of succession.

Table II

| | I | II | III | IV |
|---|---|---|---|---|
| 1 | H₂N–[OH]–N=N–[HO/HO₃S]–NH–[ ]–OCH₂COOH, SO₃H | Cr | HO–[ ]–N=N–[ ]–NH₂, HOOC | Olive green. |
| 2 | [OH]–N=N–[HO/HO₃S]–NH₂, SO₃H | Cr | HO₃S–[ ]–N=N–[OCH₃]–NH₂, H₃C | Olive brown. |
| 3 | [OH]–N=N–[HO/HO₃S]–NH₂, SO₃H | Cr | HO₃S–[ ]–N=N–[ ]–NH₂, NHCOCH₃, SO₃H | Do. |
| 4 | [OH]–N=N–[OH/HO₃S]–NH₂, SO₃H | Cr | HO–[ ]–N=N–[ ]–NH₂, HOOC | Green olive. |
| 5 | [OH]–N=N–[OH/HO₃S]–NH₂, SO₃H | Co | HO–[ ]–N=N–[ ]–NH₂, HOOC | Brown. |
| 6 | [OH]–N=N–[HO/HO₃S]–NH₂, SO₃H | Cr | HO₃S–[ ]–N=N–[OCH₃]–NH₂, H₃C | Olive. |

Table II—Continued

| | I | II | III | IV |
|---|---|---|---|---|
| 7 | [structure with OH, HO, NH₂, SO₃H, HO₃S groups] | Co | [structure with HO₃S, OCH₃, NH₂, SO₃H, H₃C] | Brown. |
| 8 | [pyrazolone structure with OH, SO₃H, NH₂] | Cr | [structure with HO, HOOC, NH₂] | Reddish orange. |
| 9 | [pyrazolone structure with H₂N, OH, SO₃H, NH₂] | Co | [structure with HO, HOOC, NH₂] | Brown yellow. |
| 10 | [naphthalene structure with OH, HO, NH₂, HO₃S, SO₃H] | Cr | [structure with HO₃S, OCH₃, NH₂, SO₃H, CH₃] | Olive green. |
| 11 | [structure with H₂N, OH, HO, SO₃H] | Cr | [structure with HO, HOOC, NH₂] | Brown. |
| 12 | [pyrazolone structure with COOH, COOH, HO, NH₂] | Cr | [structure with HO₃S, OCH₃, NH₂, SO₃H, H₃C] | Golden yellow. |
| 13 | [structure with H₂N, OH, CH₃, C=O, CONH, SO₃H] | Cr | [structure with HO₃S, OCH₃, NH₂, SO₃H, H₃C] | Yellow. |
| 14 | [naphthalene structure with OH, NH₂, H₂N, SO₃H] | Co | [structure with HO₃S, OCH₃, NH₂, SO₃H, H₃C] | Olive. |

Table II—Continued

| | I | II | III | IV |
|---|---|---|---|---|
| 15 | [structure: nitro-naphthol-sulfonic-azo-naphthylamine] | Cr | [structure: pyrazolone-azo compound with dichlorophenyl-sulfo] | Dull blue green. |
| 16 | [structure: nitro-naphthol-sulfonic-azo-naphthylamine] | Co | [structure: pyrazolone-azo compound with dichlorophenyl-sulfo] | Olive grey. |
| 17 | [structure: dihydroxy-azo-sulfonic-naphthylamine] | Co | [structure: HO₃S—phenyl—N=N—naphthyl—NH₂ with SO₃H] | Reddish brown. |

EXAMPLE 4

A neutral solution of the 1:2-cobalt complex prepared from 8.78 parts of the dyestuff of the formula given in the first paragraph of Example 1, is reacted with 3.7 parts of cyanuric chloride in the manner described in Example 2. When the acylation of the amino group is complete, there is added to the neutral solution of the dichlorotriazine derivative a neutral solution of 4.78 parts of 2-amino-5-hydroxynaphthalene-7-sulfonic acid in 200 parts of water, and the mixture is heated for a few hours at 40–45° C., during which the pH-value of the solution is maintained between 6.5 and 7 by the dropwise addition of a 1 N-solution of sodium hydroxide. When the formation of the monochlorotriazine derivative is complete, the solution is cooled to 0–5° C. and 9 parts of sodium bicarbonate are added. Into the solution is then run a solution of the diazo-compound prepared from 3.46 parts of 2-aminobenzene-1-sulfonic acid. When the coupling is complete, the dyestuff formed is precipitated with sodium chloride, filtered off and dried. The dyestuff so obtained dyes cotton and wool, red-brown tints.

EXAMPLE 5

3.76 parts of 2:4-diaminobenzene-1-sulfonic acid are dissolved in water and neutralised with sodium hydroxide. The solution is cooled to 0–5° C. and there is run in a solution of 3.7 parts of cyanuric chloride in 50 parts of acetone, the hydrochloric acid liberated being neutralised by the dropwise addition of a 1 N-solution of sodium hydroxide. After the reaction, the neutral solution of the dichlorotriazine derivative is mixed with a neutral solution of the 1:2-chromium-complex obtained in the manner described in Example 3 from 8.78 parts of the dyestuff of the formula given in the first paragraph of Example 1. The whole is heated for a few hours at 40–45° C., and the pH-value of the reaction mixture is maintained between 6.5 and 7 by the dropwise addition of a 1 N-solution of sodium hydroxide.

After the formation of the monochlorotriazine derivative the latter is diazotised in known manner with 10 parts by volume of a 2 N-solution of sodium nitrite and 10 parts by volume of hydrochloric acid of 30% strength. The diazo-compound is coupled with 3.48 parts of 3-methyl-1-phenyl-5-pyrazolone in a medium rendered alkaline with sodium carbonate, and there is obtained a dyestuff which dyes cotton olive-grey tints.

EXAMPLE 6

52.4 parts of the monoazo-dyestuff obtainable by coupling diazotized 4-nitro-2-aminophenol in an alkaline medium with 2-phenylamino-5-hydroxynaphthalene-7-sulfonic acid-3'-carboxylic acid, are converted into the 1:2-chromium complex by boiling them in 700 parts of water for 6–8 hours with 120 parts by volume of a sodium chromosalicylate solution, which contains 2.8 parts of chromium per 100 parts by volume of solution, and 12 parts of a 10 N-solution of sodium hydroxide, and then the nitro group is reduced with sodium hydrosulfide at 60–80° C. and the dyestuff is isolated.

A quantity corresponding to 0.05 mol of a neutral solution of the 1:2-chromium complex so obtained is mixed at 40° C. with a solution of the primary triazine compound obtained in the usual manner from 18.5 parts of cyanuric chloride and 52.2 parts of the dyestuff of the formula

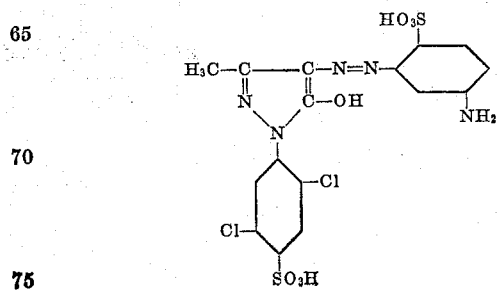

The whole is stirred for 4 hours at 40° C., and the reaction mixture is maintained neutral to weakly alkaline by the addition of sodium carbonate. The dyestuff formed is salted out, filtered off and dried. It dyes cotton green-grey tints.

EXAMPLE 7

2 parts of the dyestuff obtained as described in Example 4 are dissolved in 100 parts of water. A cotton fabric is impregnated on a foulard with the resulting solution, and then the excess liquor is removed by squeezing until the material retains 75% of its weight of dyestuff solution. The goods so impregnated are dried, and then impregnated at room temperature with a solution containing, per liter, 10 grams of sodium hydroxide and 300 grams of sodium chloride, the material is then squeezed to a weight increase of 75%, and steamed for 60 seconds at 100–101° C. The material is then rinsed, soaped for ¼ hour in an aqueous solution of 0.3% strength of a non-ionic detergent, rinsed and dried. There is obtained a red-brown dyeing that is fixed fast to boiling.

EXAMPLE 8

3 parts of the dyestuff obtained as described in Example 4 and 2 parts of sodium carbonate are dissolved in 75 parts of water with 25 parts of urea. A cotton fabric is impregnated with the solution, squeezed to a weight increase of 75%, and dried. The dyeing is then subjected to the action of dry heat at 140° C. for about 5 minutes, then rinsed and soaped. In this manner there is obtained a fast red-brown dyeing.

What is claimed is:

1. Disazo-dyestuffs which contain one atom of one of the metals selected from the group consisting of chromium and cobalt bound in complex union to two molecules of a disazo dyestuff of the formula

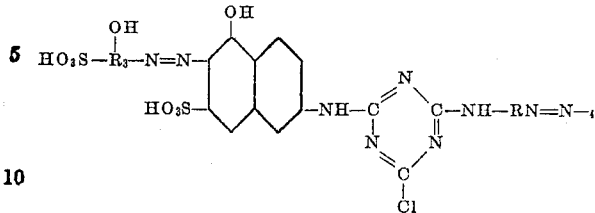

in which $R_3$ represents a mononuclear benzene radical bound to the azo linkage in ortho-position to the adjacent —OH group, R represents a mononuclear benzene radical bound to the adjacent azo linkage in p-position to the respective —NH— bridge and $R_4$ represents a member selected from the group consisting of benzene and naphthalene radicals.

2. The complex cobalt compound which contains one atom of cobalt in complex union with substantially two molecules of the azo dyestuff which in its free acid state corresponds to the formula

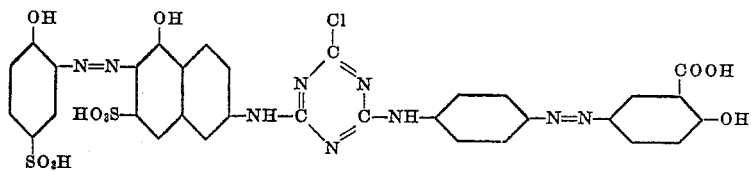

3. The complex cobalt compound which contains one atom of cobalt in complex union with substantially two molecules of the azo dyestuff which in its free acid state corresponds to the formula

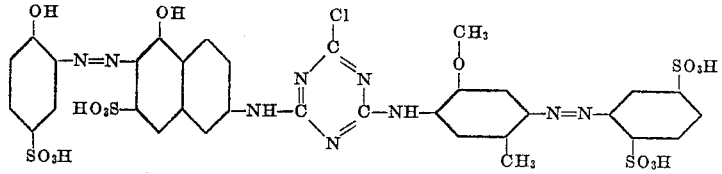

4. The complex cobalt compound which contains one atom of cobalt in complex union with substantially two molecules of the azo dyestuff which in its free acid state corresponds to the formula

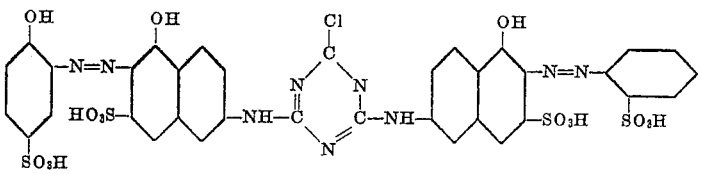

5. The complex cobalt compound which contains one atom of cobalt bound in complex union with substantially two molecules of the azo dyestuff which in its free acid state corresponds to the formula

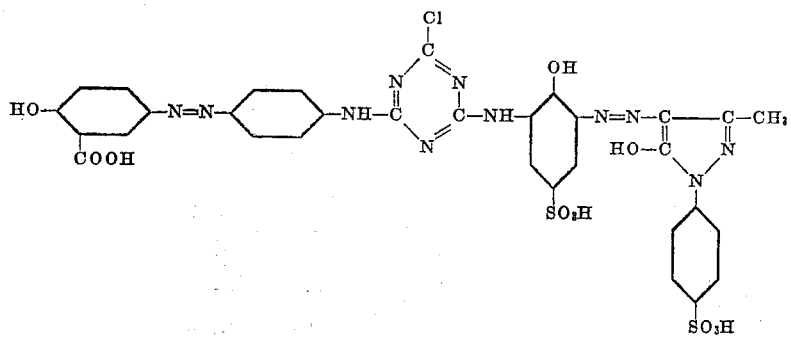

6. The complex chromium compound which contains one atom of chromium in complex union with substantially two molecules of the azo-dyestuff which in its free acid state corresponds to the formula
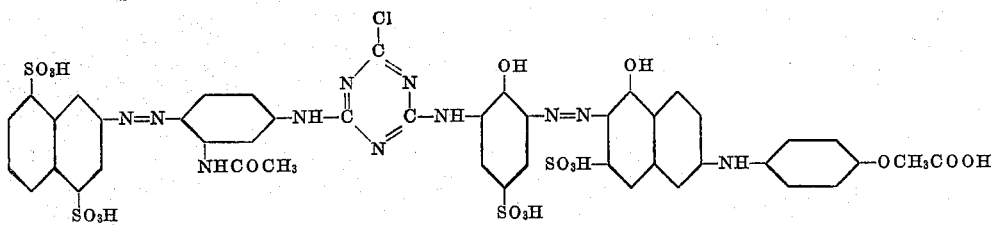
References Cited in the file of this patent
UNITED STATES PATENTS
| | | |
|---|---|---|
| 2,221,361 | Schmid | Nov. 12, 1940 |
| 2,538,568 | Kaiser et al. | Jan. 16, 1951 |
| 2,617,797 | Anderau | Nov. 11, 1952 |
| 2,749,206 | Wegmann et al. | June 5, 1956 |
| 2,756,224 | Gunst | July 24, 1956 |
| 2,762,794 | Durig | Sept. 11, 1956 |

UNITED STATES PATENT OFFICE
CERTIFICATION OF CORRECTION

Patent No. 2,963,472					December 6, 1960

Karl Seitz et al.

It is hereby certified that error appears in the above numbered patent requiring correction and that the said Letters Patent should read as corrected below.

Column 1, line 39, for "on" read -- of --; column 3, line 15, for "derivaties" read -- derivatives --; column 4, line 39, for "othoanisidine" read -- orthoanisidine --; column 8, lines 2 to 6, the right-hand portion of the formula should appear as shown below instead of as in the patent:

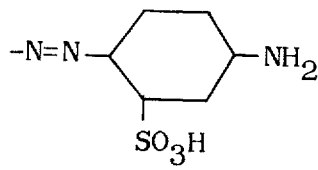

columns 11 and 12, Table II-Continued, column 2 thereof and opposite item number 8, the left-hand portion of the formula should appear as shown below instead of as in the patent:

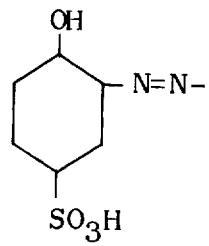

column 16, lines 3 to 11, for that portion of the formula reading "=N—$_4$" read -- =N—$R_4$ --.

Signed and sealed this 1st day of August 1961.

(SEAL)
Attest:

ERNEST W. SWIDER
Attesting Officer

DAVID L. LADD
Commissioner of Patents